United States Patent Office.

CONSTANTINE BELVESELSKY WARRAND, OF BLUFFTON, SOUTH CAROLINA, ASSIGNOR OF TWO-THIRDS TO CLAVIUS PHILLIPS AND JOHN L. HAMMOND, OF SAVANNAH, GEORGIA.

PROCESS OF MANUFACTURING IMITATION HORSE-HAIR FROM PALMETTO.

SPECIFICATION forming part of Letters Patent No. 450,119, dated April 7, 1891.

Application filed January 29, 1890. Serial No. 338,519. (No specimens.)

*To all whom it may concern:*

Be it known that I, CONSTANTINE BELVESELSKY WARRAND, a subject of the Queen of Great Britain, residing at Bluffton, in the county of Beaufort and State of South Carolina, have invented certain new and useful Improvements in Processes of Manufacturing Imitation Horse-Hair from Palmetto; and I do hereby declare the following to be a full, clear, and exact description of the invention, such as will enable others skilled in the art to which it appertains to make and use the same.

My invention relates to a method of extracting the fiber from the leaves and stems of the dwarf palmetto and other plants of the same genus and converting it into imitation horse-hair; and it consists in a process of extracting the fiber, coloring it, and rendering it springy or elastic, as will hereinafter fully appear in the specification, and be pointed out in the claim.

The palmetto contains more gums in its juices than any of the usual fiber-producing plants, and it is found that upon exposing the severed leaves and stems to the air a chemical change commences by which the gums and other components contained in the plant and its juices are converted into a brittle insoluble mass, which can never be rendered soluble in water; but by my process of manipulating the palmetto stock while green and before the juices can oxidize and coagulate, no disadvantageous chemical change occurs, and I am enabled to eliminate the gums and other objectionable components of the palmetto stock and leave a clear fiber, which by a further process is colored and rendered elastic or springy.

I use both the stems and leaves of the palmetto, the former being first crushed between rollers like cane, and then both leaves and stems are split, stripped, or hatcheled into fine shreds by mechanical means, any of the usual shredding or hatcheling machines being employed, and hence a particular description thereof is not requisite at this time. After the stock has been reduced to fine shreds, these shreds are steeped in tanks or vats of cold water for several hours and then removed to other vats containing a weak solution of caustic soda or equivalent alkali—say one ounce of soda to each gallon of water—and the temperature of this solution is raised to at least the boiling-point (212° Fahrenheit) and the stock is boiled for one hour, when the solution is drawn off and a new supply introduced. Meanwhile the charge is thoroughly agitated and mixed. This is repeated for six hours, during which time the stock is not allowed to become cold. Then the stock is subjected to a hot bath of sulphate of iron and water in the proportions of about one-quarter ounce of iron salt to each gallon of water. The alkaline solution removes the silica, renders the fiber soft and pliable, and conjointly with the heat dissolves the gums, soluble while the juices are fresh, and removes them with the other objectionable components, while the iron salt imparts a deep, lasting, purple-brown color to the resultant fiber and renders it tough and elastic.

I do not limit myself to the number of immersions in the heated solution, nor to the time employed. Six hours will usually be found sufficient to convert the crude stock into fiber, at which point the fiber is withdrawn from the vats, dried, and carded to remove a certain quantity of the gums, which is not carried away in the solution, but will be deposited in the form of a powder on the fibers. It, however, has no bad effect on the fiber and can readily be removed by carding, after which the fiber is curled or twisted and will then be found to closely resemble horse-hair and may be used for all purposes to which the latter is adapted.

An explanation of my process is that the gum, while the juice of the palmetto is fresh, is soluble and is removed with the other undesirable components of the palmetto stock through the agency of the heated alkaline solution, a portion being deposited as a sediment or incrustation upon the fiber, from which it is removed by carding, while the tannic acid and iron combine to produce the color imparted to the fiber and to render it tough and elastic. If the palmetto stock is allowed to dry, the juices oxidize and form a brittle mass, which is totally insoluble in water and cannot be removed by any chemical action or reaction that I am acquainted with.

I have found by experiment that a very small proportion of the alkali and iron salt in the separate solutions are sufficient to accomplish the twofold object of dissolving out the constituents of the palmetto juices and coloring the remaining fiber, and hence even a less quantity of the alkali might be employed; but I find in practice that about the proportions hereinbefore given are best adapted to accomplish these results.

Having thus fully described my invention, what I claim therein as new, and desire to secure by Letters Patent of the United States, is—

The process of treating green palmetto leaves and stems to extract the fiber, color, and render it tough and springy by, first, comminuting or shredding; second, steeping in water, and, third, subjecting to a series of baths of caustic soda or equivalent alkali, then to a final bath of water and sulphate of iron, next carding to remove the incrusted or powdered gum, and, lastly, curling and twisting, all substantially as described.

In testimony whereof I affix my signature in presence of two witnesses.

CONSTANTINE BELVESELSKY WARRAND.

Witnesses:
JAS. M. ENNIS,
A. B. PACETTE.